United States Patent
Barwin et al.

(10) Patent No.: US 8,656,325 B2
(45) Date of Patent: Feb. 18, 2014

(54) INTEGRATED CIRCUIT DESIGN METHOD AND SYSTEM

(75) Inventors: John E. Barwin, Essex Junction, VT (US); Amol A. Joshi, Essex Junction, VT (US); Baozhen Li, South Burlington, VT (US); Michael R. Ouellette, Westford, VT (US)

(73) Assignee: International Business Machines Corporation, Armonk, NY (US)

( * ) Notice: Subject to any disclaimer, the term of this patent is extended or adjusted under 35 U.S.C. 154(b) by 90 days.

(21) Appl. No.: 13/348,850

(22) Filed: Jan. 12, 2012

(65) Prior Publication Data

US 2013/0185684 A1 Jul. 18, 2013

(51) Int. Cl.
*G06F 17/50* (2006.01)

(52) U.S. Cl.
USPC ........... 716/100; 716/103; 716/104; 716/116; 716/133; 716/138

(58) Field of Classification Search
USPC .................. 716/100–106, 116–117, 132–138
See application file for complete search history.

(56) References Cited

U.S. PATENT DOCUMENTS

| | | | |
|---|---|---|---|
| 4,724,050 A | 2/1988 | Bergeron et al. | |
| 6,249,898 B1 | 6/2001 | Koh et al. | |
| 6,725,433 B1 | 4/2004 | Hau-Riege et al. | |
| 6,762,597 B1 | 7/2004 | Hau-Ridge et al. | |
| 6,822,437 B1* | 11/2004 | Hau-Riege et al. | 324/762.03 |
| 7,315,992 B2 | 1/2008 | Bhooshan et al. | |
| 7,471,539 B2 | 12/2008 | Oates et al. | |
| 7,749,778 B2 | 7/2010 | Chanda et al. | |
| 7,752,582 B2 | 7/2010 | Jain et al. | |
| 2009/0302476 A1* | 12/2009 | Li | 257/767 |
| 2010/0127719 A1 | 5/2010 | Federspiel | |
| 2010/0301487 A1 | 12/2010 | Kawasaki et al. | |
| 2011/0101534 A1 | 5/2011 | Stamper | |
| 2011/0173583 A1 | 7/2011 | Barwin et al. | |
| 2011/0193199 A1* | 8/2011 | Filippi et al. | 257/621 |
| 2011/0254168 A1 | 10/2011 | Ding et al. | |

(Continued)

OTHER PUBLICATIONS

Blech, "Electromigration in Thin Aluminum Films on Titanium Nitride," Journal of Applied Physics, vol. 47, No. 4, Apr. 1976, pp. 1203-1208.

(Continued)

*Primary Examiner* — Paul Dinh

(74) *Attorney, Agent, or Firm* — Gibb & Riley, LLC; David A. Cain, Esq.

(57) ABSTRACT

Disclosed is an integrated circuit design method that determines maximum direct currents for metal components and uses them as design constraints in the design flow in order to avoid/minimize electromigration failures. Short and long metal components are treated differently for purposes of establishing the design constraints. For a short metal component, the maximum direct current as a function of a given temperature for a given expected lifetime of the integrated circuit is determined, another maximum direct current is determined based on the Blech length, and the higher of these two is selected and used as the design constraint for that short metal component. For a long metal component, only the maximum direct current as a function of the given temperature for the given expected lifetime is determined and used as the design constraint. Also disclosed herein are associated system and program storage device embodiments for designing an integrated circuit.

14 Claims, 4 Drawing Sheets

(56) References Cited

U.S. PATENT DOCUMENTS

2012/0022846 A1* 1/2012 White et al. .................. 703/14
2013/0154128 A1* 6/2013 Wang et al. .................. 257/786

OTHER PUBLICATIONS

Thrasher et al., "Blech Effect in Single-Inlaid Cu Interconnects," Proceedings of the IEEE 2011 International Interconnect Technology Conference, Jun. 2001, pp. 177-179.

Krishnamoorthy et al., "Switching Constraint-driven Thermal and Reliability Analysis of Nanometer Designs," 12th International Symposium on Quality Electronic Design (ISQED), Mar. 2011, pp. 473-480.

J.R. Lloyd, Electromigration for Designers: An Introduction for the Non-Specialist, http://eetimes.com/design/eda-design/4017969/Electromigration-for-Designers-An-Introdroction for the Non-Specialist, pp. 1-16, Apr. 12, 2002.

* cited by examiner

INTEGRATED CIRCUIT DESIGN METHOD AND SYSTEM

BACKGROUND

1. Field of the Invention

The embodiments disclosed herein relate to integrated circuit design and, more particularly, to a method, system and program storage device that, based on customer-specified design parameters for an integrated circuit, including operating temperature and expected life-time, automatically selects between two different electromigration violation thresholds for a short metal component and, subsequently, uses the selected electromigration violation threshold as a design constraint for the metal component during a design flow.

2. Description of the Related Art

Those skilled in the art will recognize that there are various failure mechanisms, which are associated with different classes of devices and/or with metal components of an integrated circuit (e.g., nets, local-interconnects, pads, vias, etc.) and which can cause the performance of integrated circuit to degrade over time. One such failure mechanism is electromigration. Electromigration is a condition in which atoms of a metal component are displaced due to the current passing through that metal component. Over time this metal atom displacement can cause cracks (i.e., voids, opens, etc.) in the metal component and can result in either increased resistance or failure. Since electromigration is caused by the collision between electrons and metal ions as direct current passes through the metal component, it is significant at relatively high direct current densities (i.e., when the ratio of direct current flow to unit area of cross-section is relatively high) and it is accelerated at relatively high temperatures. Consequently, as integrated circuit feature sizes decrease resulting in a corresponding increase in current density and as integrated circuit operating temperatures and expected lifetimes (i.e., power-on-hours (POH)) also increase at each new technology node, failures due to electromigration have become a major concern for integrated circuit designers.

SUMMARY

Disclosed herein are embodiments of an integrated circuit design method that determines maximum direct currents for metal components and uses them as design constraints in the design flow in order to avoid/minimize electromigration failures. In the embodiments, short and long metal components can be treated differently for purposes of establishing the design constraints in order to allow for relief from the application of strict electromigration limits in cases where, due to the Blech effect exhibited by short metal components, electromigration is not of concern. For a short metal component, the maximum direct current as a function of a given temperature for a given expected lifetime of the integrated circuit can be determined, another maximum direct current can be determined based on the Blech length, and the higher of these two can be selected and used as the design constraint for that short metal component. For a long metal component, only the maximum direct current as a function of the given temperature for the given expected lifetime can be determined and used as the design constraint, since the Blech effect does not apply. Also disclosed herein are associated system and program storage device embodiments for designing an integrated circuit.

More particularly, disclosed herein are embodiments of an integrated circuit design method that determines maximum direct currents for metal components in the integrated circuit and uses them as design constraints in the design flow (e.g., during synthesis, placement, routing, timing analysis, etc.) in order to avoid and/or minimize electromigration failures. However, in these method embodiments, short and long metal components can be treated differently for purposes of establishing the design constraints in order to allow for relief from the application of strict electromigration limits in cases where, due to the Blech effect exhibited by short metal components, electromigration is not of concern.

Specifically, for a short metal component of an integrated circuit (i.e., a metal component that has a length that is shorter than a Blech length), a first maximum direct current as a function of a given temperature (e.g., a customer-specified maximum operating temperature) for a given expected lifetime of the integrated circuit (e.g., a customer-specified number of power-on-hours (POH) for the integrated circuit) can be determined. Additionally, for this short metal component, a second maximum direct current can be determined based on the Blech length. It should be noted that the second maximum direct current can be essentially constant over a range of temperatures and expected lifetimes. Then, the higher of the first maximum direct current and the second maximum direct current can be automatically selected as the design constraint for the short metal component. However, for a long metal component, only the maximum direct current as a function of the given temperature for the given expected lifetime need be determined (since the Blech effect does not apply) to establish the design constraint. Subsequently, the design constraints established for both the short and long metal components can be used in the design flow (e.g., during synthesis, placement, routing, timing analysis, etc.).

Also disclosed herein are embodiments of an integrated circuit design system. The system can comprise a memory and at least one processor in communication with the memory. The memory can store a description of the integrated circuit. The processor(s) can access the description and process it in a design flow in order to ultimately generate a final design structure. The processor(s) can comprise a design constraint calculator that determines maximum direct currents for metal components in the integrated circuit and various design tools that can uses these maximum direct currents as design constraints in the design flow (e.g., during synthesis, placement, routing, timing analysis, etc.) in order to avoid and/or minimize electromigration failures. However, in these embodiments, the design constraint calculator can treat short and long metal components differently for purposes of establishing the design constraints in order to allow for relief from the application of strict electromigration limits in cases where, due to the Blech effect exhibited by short metal components, electromigration is not of concern.

Specifically, for a short metal component of an integrated circuit (i.e., a metal component that has a length that is shorter than a Blech length), the design constraint calculator can determine a first maximum direct current as a function of a given temperature (e.g., a customer-specified maximum operating temperature) for a given expected lifetime of the integrated circuit (e.g., a customer-specified number of power-on-hours (POH) for the integrated circuit). Additionally, for this short metal component, the design constraints calculator can determine a second maximum direct current based on the Blech length. It should be noted that this second maximum direct current can be essentially constant over a range of temperatures and expected lifetimes. The design constraints calculator can then automatically select the higher of the first maximum direct current and the second maximum direct current as the design constraint for the short metal component. However, for a long metal component, the design constraints calculator can determine the maximum direct current as a function of the given temperature for the given expected lifetime along (since the Blech effect does not apply) in order to establish the design constraint. Subsequently, the other design tools in the system can use the design constraints for the short and long metal component in the design flow (e.g., during synthesis, placement, routing, timing analysis, etc.).

Also disclosed herein are embodiments of a non-transitory program storage device. This program storage device can be readable by a computer and can tangibly embody (i.e., store) a program of instructions that is executable by the computer to perform the above-described method of designing an integrated circuit.

BRIEF DESCRIPTION OF THE DRAWINGS

The embodiments disclosed herein will be better understood from the following detailed description with reference to the drawings, which are not necessarily drawn to scale and in which.

DETAILED DESCRIPTION

Figure 1:
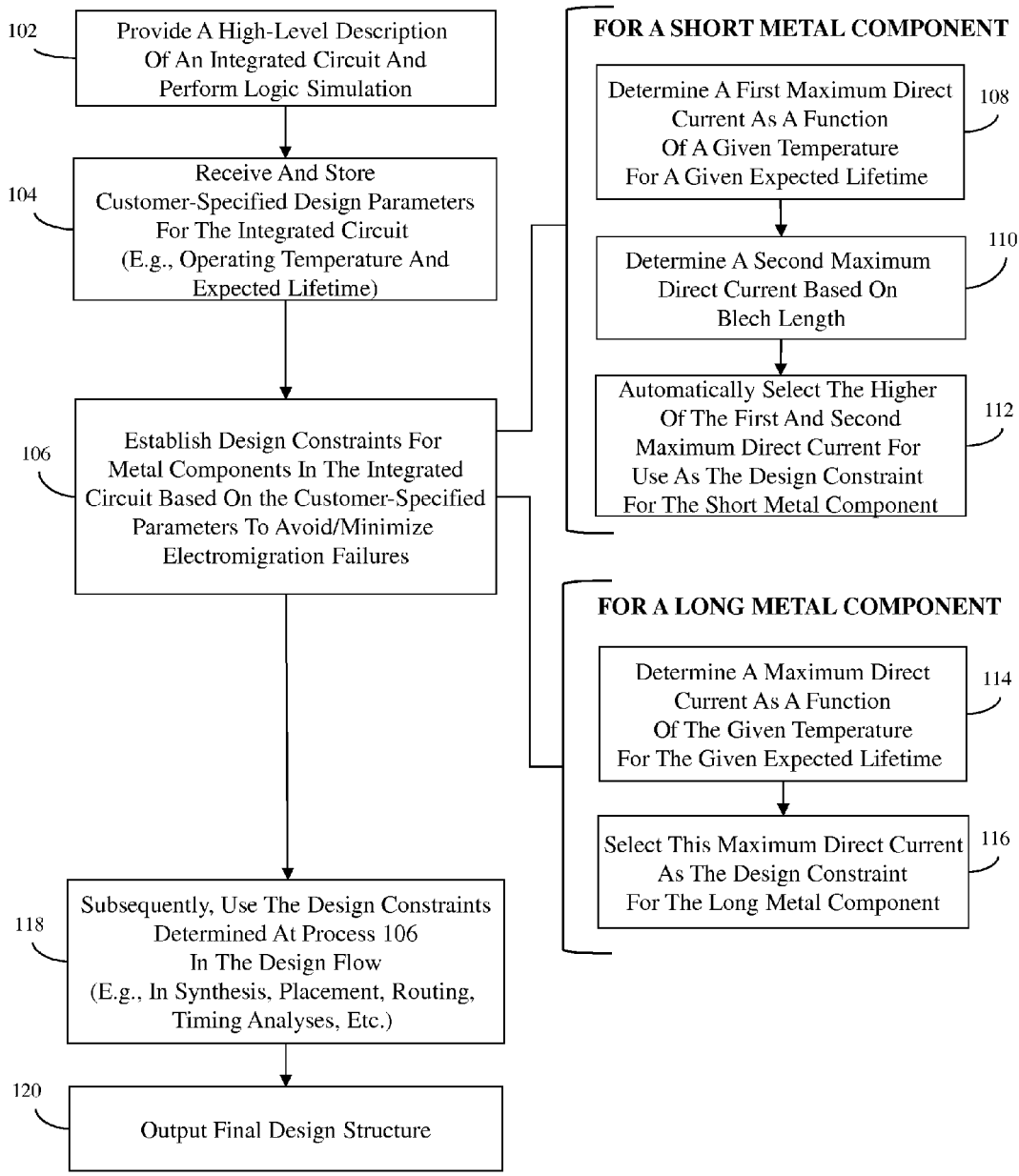
FIG. 1 is a flow diagram illustrating embodiments of an integrated circuit design method.

As mentioned above, there are various failure mechanisms, which are associated with different classes of devices and/or with metal components of an integrated circuit (e.g., interconnects, wires, pads, vias, etc.) and which can cause the performance of integrated circuits to degrade over time. One such failure mechanism is electromigration. Electromigration is a condition in which atoms of a metal component are displaced due to the current passing through that metal component. Over time this metal atom displacement can cause cracks (i.e., voids, opens, etc.) in the metal component and can result in either increased resistance or failure. Since electromigration is caused by the collision between electrons and metal ions as direct current passes through the metal component, it is significant at relatively high direct current densities (i.e., when the ratio of direct current flow to unit area of cross-section is relatively high) and it is accelerated at relatively high temperatures. Consequently, as integrated circuit feature sizes decrease resulting in a corresponding increase in current density and as integrated circuit operating temperatures and expected lifetimes (i.e., power-on-hours (POH)) also increase at each new technology node, failures due to electromigration have become a major concern for very large scale integrated circuit (VLSI) designers.

Specifically, since the potential for an electromigration failure has increased with technology scaling in conjunction with increased operating temperatures and increased expected lifetimes, designers must design integrated circuits so as to at least delay electromigration failures until it no longer matters (i.e., until after the expected lifetime (POH) of the integrated circuit has passed). This is done through the use of design constraints that are used in the design flow (e.g., synthesis, placement, routing, timing analysis, etc.) to set limits on the maximum direct current densities for specific metal components. Furthermore, since the size of the metal component is set by design, the maximum direct current density is actually limited by establishing a maximum direct current (i.e., a direct current load threshold) for the metal component to avoid and/or minimize electromigration failures. Typically, this maximum direct current is pre-determined for a given technology so as to avoid an electromigration failure under the worst-case conditions. However, not all integrated circuits in a given technology or metal components within an integrated circuit will be subject to such worst-case conditions. Thus, it would be advantageous over the prior art to optimally manage electromigration across a broader design requirement space and still avoid and/or minimize electromigration failures and, thereby reduce the number of repair operations required.

In view of the foregoing, disclosed herein are embodiments of an integrated circuit design method that determines maximum direct currents (i.e., direct current load thresholds) for metal components and uses them as design constraints in the design flow in order to avoid/minimize electromigration failures. In the embodiments, short and long metal components can be treated differently for purposes of establishing the design constraints in order to allow for relief from the application of strict electromigration limits in cases where, due to the Blech effect exhibited by short metal components, electromigration is not of concern. For a short metal component, the maximum direct current as a function of a given temperature for a given expected lifetime of the integrated circuit can be determined, another maximum direct current can be determined based on the Blech length, and the higher of these two can be selected and used as the design constraint for that short metal component. For a long metal component, only the maximum direct current as a function of the given temperature for the given expected lifetime can be determined and used as the design constraint, since the Blech effect does not apply. Also disclosed herein are associated system and program storage device embodiments for designing an integrated circuit.

More particularly, referring to the flow diagram of FIG. 1, disclosed herein are embodiments of an integrated circuit design method that determines maximum direct currents (i.e., direct current load thresholds) for metal components in the integrated circuit and uses them as design constraints in the design flow (e.g., during synthesis, placement, routing, timing analysis, etc.) in order to avoid and/or minimize electromigration failures. However, in these method embodiments, short and long metal components can be treated differently for purposes of establishing the design constraints in order to allow for relief from the application of strict electromigration limits in cases where, due to the Blech effect exhibited by short metal components, electromigration is not of concern.

It should be understood that the disclosed method embodiments could be implemented, in whole or in part, in a computer hardware environment (e.g., a computer system) such as that described in detail below and depicted in FIG. 4. Alternatively, the method embodiments could be implemented on any other computerized device having the required data storage and processing capability to perform the described processes (e.g., a distributed computer system of multiple autonomous computer that communicate through a computer network, a laptop computer, a tablet computer, etc.).

Specifically, referring to the flow diagram of FIG. 1, the method embodiments can comprise storing, in memory, a high-level description of an integrated circuit (102). This high-level description can comprise, for example, a register-transfer level (RTL) description for an application-specific integrated circuit (ASIC). Logic-simulation of this high-level description can be performed (e.g., by a logic simulator tool) in order to verify the description logic.

Customer-specified design parameters for the integrated circuit can be received and stored in memory (104). These customer-specified design parameters can include, but not limited to, a maximum expected operating temperature for the integrated circuit and an expected lifetime of the integrated circuit (i.e., an expected number of power-on-hours (POH)).

Next, design constraints for the various metal components in the integrated circuit, as specified in the high-level, can be determined based on the customer-specified parameters in order to avoid and/or minimize electromigration failures within the expected lifetime of the integrated circuit (106). These metal components can include, but are not limited to, the following: metal wires (e.g., nets interconnecting multiple devices in the integrated circuit or local interconnects between devices or between cells, such as in the case of an application-specific integrated circuit (ASIC)), metal pads, metal vias, etc. It should be understood that, for purposes of this disclosure, the term "cell" refers to a single device or group of multiple interconnected devices.

As mentioned above, such metal components are generally subject to electromigration. However, those skilled in the art will recognize that the "Blech effect" refers to the observation that electromigration within relatively short metal components can actually cease to occur, regardless of the current density, because of a mechanical back stress that results from such electromigration. A "Blech length" of a metal component refers to the length at which electromigration ceases to occur due to the Blech effect and this Blech length will vary as a function of the physical design of the integrated circuit that incorporates the metal component. As integrated circuits continue to scale in size with each new technology node, many metal components thereof (e.g., local interconnects and vias) are becoming short enough to have Blech lengths (i.e., to exhibit this Blech effect). Consequently, as mentioned above, in the embodiments disclosed herein, short and long metal components can be treated differently for purposes of establishing the design constraints in order to allow for relief from the application of strict electromigration limits in cases where, due to the Blech effect exhibited by short metal components, electromigration is not of concern.

Specifically, for a short metal component of an integrated circuit (i.e., a metal component that has a length that is shorter than a Blech length), a first maximum direct current as a function of a given temperature (e.g., the customer-specified maximum operating temperature) for a given expected lifetime of the integrated circuit (e.g., the customer-specified number of power-on-hours (POH) for the integrated circuit) can be determined (108).

This first maximum direct current can, for example, be determined based on "Black's equation". Specifically, those skilled in the art will recognize that Black's equation is an equation for the mean time to failure (MTTF) of the circuit component at issue due to electromigration and is expressed as follows:

$$\text{MTTF} = Aj^{-n}e^{Ea/kT}, \quad (1)$$

where A is a constant, j is the current density, Ea is the energy of activation, k is Boltzman's constant and T is temperature in Kelvin and where current density j is expressed as follows:

$$j = I/a, \quad (2)$$

where I is a measure of direct current and a is an area measurement of a cross-section of the metal component.

Figure 2:
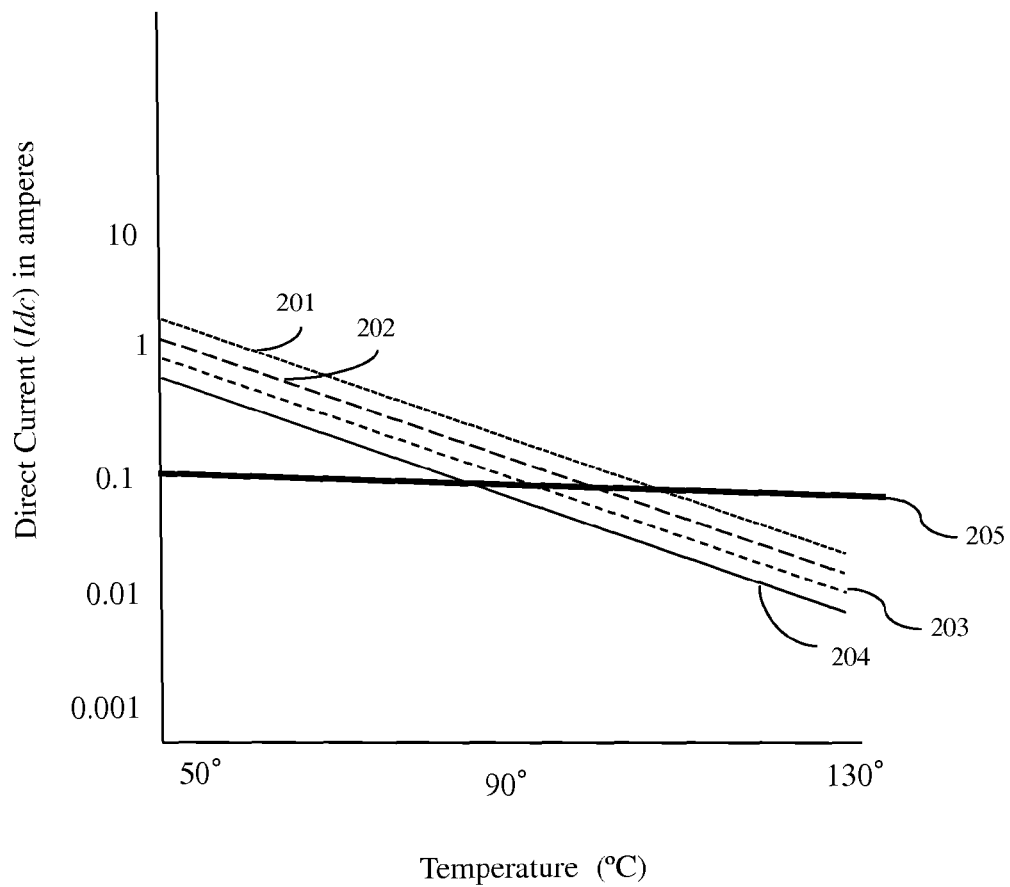
FIG. 2 is a graph illustrating maximum direct current temperature as a function of temperature for multiple different expected lifetimes of an exemplary metal component.

In these equations (1)-(2), a given expected lifetime (e.g., the customer-specified expected lifetime) can be substituted for MTTF, a given temperature (e.g., the customer-specified maximum operating temperature) can be converted to Kelvin, if necessary, and substituted for T, and a can be fixed by design, thereby allowing the value of the maximum direct current I to be calculated. As a result, if the given expected lifetime is increased and/or if the given temperature is increased, the maximum direct current will be decreased. For example, FIG. 2 is a graph with lines 201-204 representing different expected lifetimes (e.g., line 201 can represent an expected lifetime of 60 kPOH, line 202 can represent an expected lifetime of 80 kPOH, line 203 can represent an expected lifetime of 100 kPOH and line 204 can represent an expected lifetime of 120 kPOH) of an integrated circuit. Each line 201-204 can illustrate the maximum direct current for a metal component in the integrated circuit as a function of temperature. As shown, increasing the expected lifetime and/or increasing the temperature, will result in a decrease in the maximum direct current.

Additionally, for this short metal component, a second maximum direct current can be determined based on the Blech length, using the following Blech Effect formula (110).

$$v_d = \frac{D_{0,\mathit{eff}}}{kT} e^{\left(-\frac{\Delta H}{kT}\right)} \left( Z * e\rho j - \Omega \frac{\Delta \sigma}{\Delta L} \right), \quad (3)$$

where $V_d$ is the metal ion (e.g., copper) drift velocity, where $$\frac{D_{0,\mathit{eff}}}{kT} e^{\left(-\frac{\Delta H}{kT}\right)}$$

is the diffusion thermal effect, where $Z*e\rho j$ is the driving force current density effect, where $$\Omega \frac{\Delta \sigma}{\Delta L}$$

is the back flow force stress effect, and where $$Z * e\rho j - \Omega \frac{\Delta \sigma}{\Omega L} = 0$$

when Vd=0 (i.e., when there is no net metal ion drift). The following formula can be used to simplify the above Blech Effect equation:

$$j = (jL)c/L, \quad (4)$$

where (jL)c can be constant, where j equals current density, where L equals line length, and where electromigration (EM) is immortal, when jL<(jL)c.

It should be noted that the second maximum direct current that is determined based on the Blech length can be essentially constant over a range of temperatures and expected lifetimes (i.e., it does not vary with changes in temperature or expected lifetime). That is, the graph of FIG. 2 further shows a line 205 representing a maximum direct current calculated for a short metal component based on the Blech length of the short metal component. As shown, the maximum direct current in this case is essentially constant across the entire temperature range and also for the various expected lifetimes represented by lines 201-205.

Then, the higher of the first maximum direct current and the second maximum direct current can be automatically selected as the design constraint for the short metal component (112).

For example, referring to FIG. 2, consider the case where the customer specifies an expected lifetime of 120 kPOH and an expected maximum operating temperature of 130° C. In this case, the first maximum direct current for a short metal component will be approximately 0.01 amperes, as shown by line 204. However, the second maximum direct current for this short metal component, as determined based on the Blech length and as represented by line 205, will be approximately 0.1 amperes. Thus, the second maximum direct current length for this short metal component, which is higher, will selected for use as the design constraints in order to allow for relief from the application of the more strict electromigration limit on line 204.

Alternatively, consider the case where the customer specifies an expected lifetime of 120 kPOH and an expected maximum operating temperature of 50° C. In this case, the first maximum direct current for a short metal component will be approximately 1 amperes, as shown by line 204. However, the second maximum direct current for this short metal component, as determined based on the Blech length and as represented by line 205, will still be approximately 0.1 amperes. Thus, the first maximum direct current length for this short metal component, which is higher, will be selected for use as the design constraint.

Consequently, the process of automatically selecting the higher of the two determined maximum direct currents for a short metal component allows the most liberal design constraint (i.e., the most advantageous design constraint) to be used, while still ensuring that electromigration failures during the expected lifetime of the integrated circuit are avoided/minimized.

Contrarily, for a long metal component (i.e., a metal component that has a length that is shorter than a Blech length), only the maximum direct current as a function of the given temperature for the given expected lifetime need be determined to establish the design constraint (since the Blech effect does not apply) (114, 116). That is, for an additional metal component of the integrated circuit and, particularly, for a long metal component having a length that is greater than the Blech length, an additional maximum direct current as a function of the given temperature for the given expected lifetime is determined at process 114 in essentially the same manner as described in detail above with regard to a short metal component at process 108. Since this long metal component does not have a Blech length, the additional maximum direct current at the given temperature is automatically selected as the design constraint for the long metal component (i.e., as additional design constraint).

Subsequently, the design constraints established at process step 106 for both the short and long metal components can be used in the design flow (e.g., during synthesis, placement, routing, timing analysis, etc.) to ensure that electromigration failures prior to the end of the expected lifetime are avoided and/or minimized (118).

Specifically, the high-level description of the integrated circuit can be synthesized into (i.e., converted into) an optimized lower-level description (e.g., a netlist) using the design constraints. For example, consider a case where the metal component comprises a local interconnect that provides a series connection from a first cell to a second cell in an application-specific integrated circuit (ASIC). In this case, the high-level description (e.g., the register-transfer level (RTL) description) of the ASIC can be synthesized into the netlist using the design constraint for the local interconnect as a condition for selecting the first cell from a cell library. That is, the first cell can be automatically selected from amongst multiple cells that are in the same class and are stored in the cell library, as long as the selected first cell has an output pin with a maximum direct current load that is no greater than the design constraint established at process 106. The maximum direct current load at the output pin of each cell can be specified in the cell library and/or can be determined (e.g., using Black's equation, as described in detail above).

After the high-level description of the integrated circuit is synthesized into the optimized lower-level description, the lower-level description can be further converted into a layout for the integrated circuit. Specifically, the placement of devices and, more particularly, the placement of cells, as set forth in the lower-level description can be determined such that the design constraints are not violated. That is, parasitic capacitances or other parasitics that might impact the loads on metal components can be considered during placement so as to ensure that the design constraints are not violated. For example, again consider the case where the metal component comprises a local interconnect that provides a series connection from a first cell to a second cell in an application-specific integrated circuit (ASIC). In this case, if during placement, parasitic capacitances from adjacent structures (e.g., devices, cells, wires, etc.) cause the direct current load on the local interconnect between the first cell and the second cell to go above the maximum direct current load at the output pin of the first cell and, more particularly, above the design constraint, either the placement can be adjusted or synthesis can be repeated in order to select a first cell with an even lower maximum direct current load at its output pin.

Once synthesis and placement are established, routing can be performed to add signal and power supply lines to the design such that the design constraints are not violated. That is, parasitic capacitances or other parasitics that might impact the loads on metal components can be considered during routing so as to ensure that the design constraints are not violated. For example, again consider the case where the metal component comprises a local interconnect that provides a series connection from a first cell to a second cell in an application-specific integrated circuit (ASIC). In this case, if during routing, parasitic capacitances from the added lines cause the direct current load on the local interconnect between the first cell and the second cell to go above the maximum direct current load at the output pin of the first cell and further above the design constraint, either the routing can be adjusted or placement and/or synthesis can be repeated in order to achieve an even lower direct current on the metal component prior to routing. Additionally, timing analyses can be performed and violations of the design constraints established at process 106 can be reported out and the synthesis, placement and/routing processes can be repeated, as necessary in order to avoid violations.

Finally, the final results of the synthesis, placement, routing and timing analysis processes can be compiled in order to generate a final design structure, which can be stored and/or output, as discussed below (120). The final design structure, as generated, can comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce the integrated circuit chip.

This final design structure can, for example, reside in a storage medium or in programmable gate array in a data format used, for example, for the exchange of layout data of integrated circuits and/or a symbolic data format (e.g. information stored in a GDSII (GDS2), GL1, OASIS, map files, or any other suitable format for storing such design data structures). This final design structure may further be output so that it can proceed to tape-out, be released to manufacturing, be released to a mask house, be sent to another design house, be sent back to a customer, etc.

Figure 3:
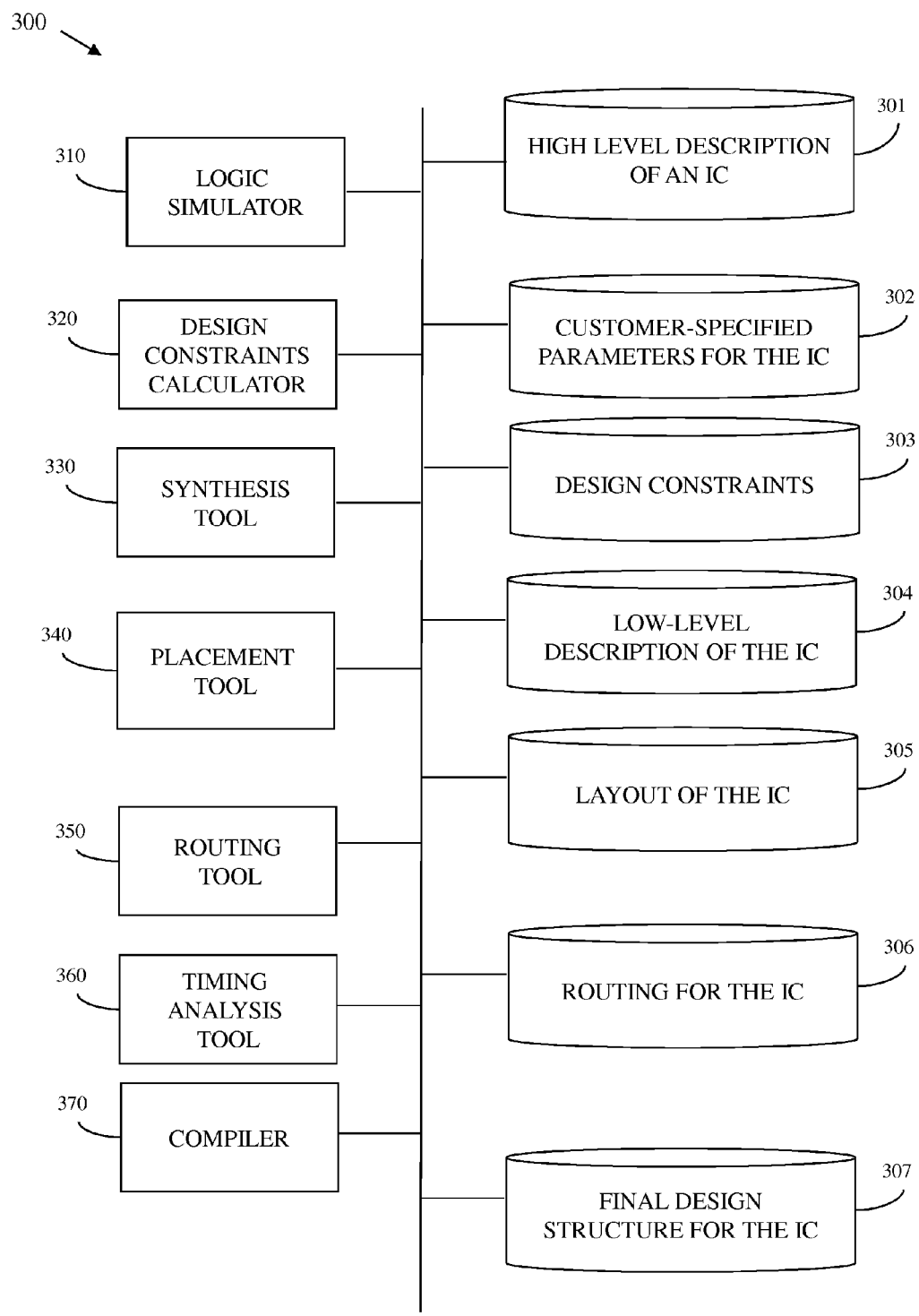
FIG. 3 is a schematic diagram illustrating embodiments of an integrated circuit design system.

Referring to FIG. 3, also disclosed herein are embodiments of an integrated circuit design system 300. The system embodiments can be implemented, for example, in a computer hardware environment such as that described in detail below and depicted in FIG. 4. Alternatively, the system embodiments could be implemented on any other computerized device having the required data storage and processing capability to perform the described processes (e.g., a distributed computer system of multiple autonomous computer that communicate through a computer network, a laptop computer, a tablet computer, etc.). In any case, this system 300 can comprise one or more memory devices (e.g., data storage devices) and one or more processors in communication with the memory device(s).

The memory device(s) can store (i.e., can be adapted to store, configured to store, etc.) at least a high-level description 301 of an integrated circuit and customer-specified design parameters 302 for the integrated circuit. The high-level description 301 can comprise, for example, a register-transfer level (RTL) description for an application-specific integrated circuit (ASIC). The customer-specified design parameters can include, but not limited to, a maximum expected operating temperature for the integrated circuit and an expected lifetime of the integrated circuit (i.e., an expected number of power-on-hours (POH)).

The processor(s) can comprise, for example, a logic simulator 310, a design constraints calculator 320, a synthesis tool 330, a placement tool 340, a routing tool 350, a timing analysis tool 360 and a compiler 370.

Logic-simulation tool 310 can perform logic simulation (i.e., can be adapted to perform logic simulation, configured to perform logic simulation, programmed to perform logic simulation) on the high-level description in order to verify the description logic.

The design calculator 320 can determine (i.e., can be adapted to determine, can be configured to determine, can execute a software program to determine, etc.) design constraints 303 for the various metal components in the integrated circuit, as specified in the high-level description 301, based on the customer-specified parameters 302 in order to avoid and/or minimize electromigration failures within the expected lifetime of the integrated circuit. However, as discussed in detail above with regard to the method embodiments, in the embodiments disclosed herein, short and long metal components can be treated differently for purposes of establishing the design constraints in order to allow for relief from the application of strict electromigration limits in cases where, due to the Blech effect exhibited by short metal components, electromigration is not of concern.

Specifically, for a short metal component of an integrated circuit (i.e., a metal component that has a length that is shorter than a Blech length), the design calculator 320 can determine a first maximum direct current as a function of a given temperature (e.g., the customer-specified maximum operating temperature) for a given expected lifetime of the integrated circuit (e.g., the customer-specified number of power-on-hours (POH)) for the integrated circuit). This first maximum direct current can, for example, be determined based on "Black's equation", as discussed in detail above with regard to process step 108 of FIG. 1. Additionally, for this short metal component, the design constraints calculator 320 can determine a second maximum direct current based on the Blech length, as discussed in detail above with regard to process step 110 of FIG. 1. Again, it should be noted that the second maximum direct current determined based on the Blech length can be essentially constant over a range of temperatures and expected lifetimes. Then, the design constraints calculator 320 can automatically select the higher of the first maximum direct current and the second maximum direct current as the design constraint for the short metal component, as discussed in detail above with regard to process step 112 of FIG. 1. Thus, for short metal components, the design constraints calculator 320 allows (i.e., is adapted to allow, configured to allow, executes programs to allow, etc.) the most liberal design constraints to be selected, while still ensuring that electromigration failures during the expected lifetime of the integrated circuit are avoided/minimized.

For a long metal component (i.e., a metal component that has a length that is shorter than a Blech length), the design constraints calculator 320 need only determine the maximum direct current as a function of the given temperature for the given expected lifetime to establish the design constraint (since the Blech effect does not apply), as discussed in detail above with regard to process steps 114-116 of FIG. 1. That is, for an additional metal component of the integrated circuit and, particularly, for a long metal component having a length that is greater than the Blech length, the design constraints calculator 320 can determine an additional maximum direct current as a function of the given temperature for the given expected lifetime is determined in essentially the same manner as described in detail above with regard to a short metal component. Since this long metal component does not have a Blech length, the additional maximum direct current at the given temperature is automatically selected as the design constraint for the long metal component (i.e., as additional design constraint).

Once determined, the design constraints 303 can be stored in memory and accessed by other design tools (e.g., the synthesis tool 330, the placement tool 340, the routing tool 350, etc.) in the design flow (e.g., during synthesis, placement, routing, etc.). Specifically, these other design tools can access and use (i.e., can be adapted to access and use, can be configured to access and use, can execute software programs that access and use, etc.) the design constraints 303 for both the short and long metal components in the design flow to ensure that electromigration failures prior to the end of the expected lifetime are avoided and/or minimized, as discussed in detail above with regard to process step 118 of FIG. 1.

Specifically, using the design constraints 303, the synthesis tool 330 can synthesize (i.e., can be adapted to synthesize, can be configured to synthesize, can execute a software program to synthesize, etc.) the high-level description of the integrated circuit into an optimized lower-level description 304 (e.g., a netlist). For example, consider a case where the metal component comprises a local interconnect that provides a series connection from a first cell to a second cell in an application-specific integrated circuit (ASIC). In this case, the synthesis tool 330 can synthesize the high-level description (e.g., the register-transfer level (RTL) description) of the ASIC into the netlist using the design constraint for the local interconnect as a condition for selecting the first cell from a cell library. That is, the first cell can be automatically selected by the synthesis tool 330 from amongst multiple cells that are in the same class and are stored in the cell library, as long as the selected first cell has an output pin with a maximum direct current load that is no greater than the design constraint established by the design constraints calculator 320. The maximum direct current load at the output pin of each cell can be specified in the cell library and/or can be determined (e.g., using Black's equation, as described in detail above). The resulting lower-level description 304 can then be stored in memory.

Furthermore, using the design constraints 303, the placement tool 340 can convert (i.e., can be adapted to convert, can be configured to convert, can execute a software program to convert, etc.) the lower-level description 304 into a layout 305 for the integrated circuit. For example, the placement tool 340 can determine the placement of devices and, more particularly, the placement of cells by considering parasitic capacitances or other parasitics that might impact the loads on metal components so as to ensure that the design constraints are not violated. The layout 305 can then be stored in memory. Following synthesis by the synthesis tool 330 and placement by the placement tool 340, the routing tool 350 can, using the design constraints 303, generate (i.e., can be adapted to generate, can be configured to generate, can execute a software program to generate, etc.) a detailed routing 306 for the integrated circuit. For example, the routing tool 350 can determine routing (i.e., can add signal and power supply lines to the design) by considering parasitic capacitances or other parasitics that might impact the loads on metal components during routing so as to ensure that the design constraints 303 are not violated. The detailed routing 306 can then be stored in memory.

Additionally, the timing analysis tool 360 can perform (i.e., can be adapted to perform, can be configured to perform, can execute a software program to perform) timing analyses and can report out any violations of the design constraints 303. In response, synthesis, placement and/or routing can be repeated, as necessary, by the appropriate tools 330, 340, 350 in order to avoid such violations. Finally, the compiler 370 can compile (i.e., can be adapted to compile, can be configured to compile, can execute a software program that compiles, etc.) the final results from the other design tools (i.e., the synthesis tool 330, the placement tool 340, the routing tool 350 and the timing analysis tool 360) in order to generate a final design structure 307, which can be stored in memory and/or output, as discussed in detail above with regard to the method embodiments.

As described above and illustrated in FIG. 3, the processor(s) can comprise discrete units (e.g., discrete computer systems or discrete computer processing units (i.e., discrete processors)) corresponding to each of the different components (i.e., to the logic simulator 310, the design constraints calculator 320, the synthesis tool 330, the placement tool 340, the routing tool 350, and the compiler 360). However, alternatively, any two or more of these components can be implemented using a single unit (e.g., by a single computer system or by a single computer processing unit (i.e., a single processor)). Similarly, as described above and illustrated in FIG. 3, the stored information (e.g., the high-level description 301, the customer-specified parameters 302, the design constraints 303, the low-level description 304, layout 305, the routing 306, the final design structure 307, etc.) can be stored by discrete memories (i.e., discrete data storage devices). However, alternatively, any of this stored information can be stored on the same memory (i.e., on the same data storage device).

Also disclosed herein are embodiments of a non-transitory program storage device (i.e., a computer program product). This program storage device can be readable by a computer and can tangibly embody (i.e., store) a program of instructions that is executable by the computer to perform the above-described method of designing an integrated circuit.

Specifically, as will be appreciated by one skilled in the art given above-description of the method and system, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a program storage device (i.e., a computer program product) embodied in one or more computer readable medium(s) having computer readable program code embodied thereon.

Any combination of one or more computer readable medium(s) may be utilized. The computer readable medium may be a non-transitory computer readable storage device or a computer readable signal medium. A non-transitory computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

As mentioned above, the computer readable medium can alternatively comprise a computer readable signal medium that includes a propagated data signal with computer readable program code embodied therein, for example, in baseband or as part of a carrier wave. Such a propagated signal may take any of a variety of forms, including, but not limited to, electro-magnetic, optical, or any suitable combination thereof. This computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the disclosed embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the disclosed embodiments are described above with reference to flowchart illustrations and/or block diagrams of methods, apparatus (systems) and computer program products. It will be understood that each block of the flowchart illustrations and/or D-2 block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
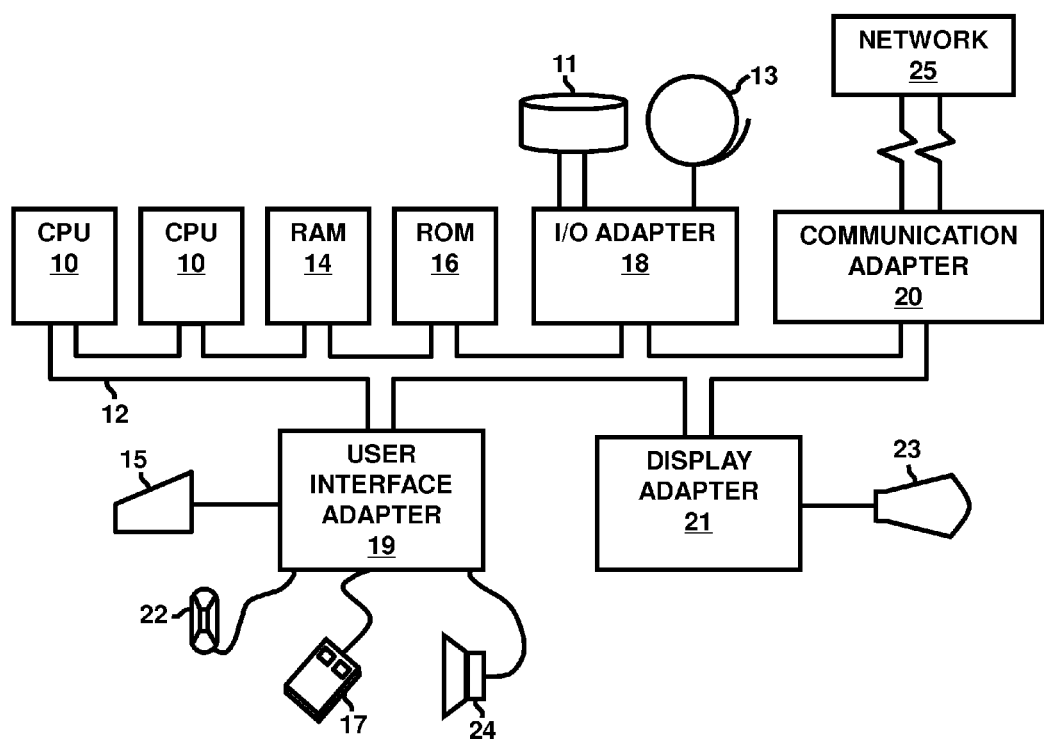
FIG. 4 is a schematic diagram illustrating an exemplary hardware environment for implementing the disclosed embodiments.

As mentioned above, a representative hardware environment is depicted in FIG. 4 for implementing the disclosed method, system and program storage device (i.e., computer program product) embodiments, as discussed in detail above. This schematic drawing illustrates a hardware configuration of an information handling/computer system in accordance with the disclosed embodiments. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the disclosed embodiments. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example. Alternatively, the disclosed method, system and program storage device embodiments could be implemented on any other computerized device having the processing capability described (e.g., a laptop computer, tablet computer, handheld device, smart phone, etc.). Alternatively, the disclosed method, system and program storage device embodiments could be implemented on any other computerized device having the data storage and processing capability to perform the described plotting and analysis (e.g., a laptop computer, tablet computer, handheld device, smart phone, etc.).

The flowchart and block diagrams in the Figures illustrate the architecture, functionality, and operation of possible implementations of systems, methods and computer program products according to various embodiments herein. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be understood that the terminology used herein is for the purpose of describing particular embodiments only and is not intended to be limiting. As used herein, the singular forms "a", "an" and "the" are intended to include the plural forms as well, unless the context clearly indicates otherwise. It should further be understood that the terms "comprises", "comprising", "included", and/or "including", when used in this specification, specify the presence of stated features, integers, steps, operations, elements, and/or components, but do not preclude the presence or addition of one or more other features, integers, steps, operations, elements, components, and/or groups thereof. It should further be understood that corresponding structures, materials, acts, and equivalents of all means or step plus function elements in the claims below are intended to include any structure, material, or act for performing the function in combination with other claimed elements as specifically claimed. Finally, it should be understood that the above-description of the embodiments was presented for purposes of illustration and was not intended to be exhaustive or limiting. Many modifications and variations will be apparent to those of ordinary skill in the art without departing from the scope and spirit of the disclosed embodiments.

Therefore, disclosed above are embodiments of a computer-implemented integrated circuit design method that determines maximum direct currents for metal components and uses them as design constraints in the design flow (e.g., during synthesis, placement, routing, etc.) in order to avoid and/or minimize electromigration failures. In these embodiments, short metal components (i.e., a metal component having a length that is shorter than a Blech length) and long metal components (i.e., a metal component having a length that is longer than the Blech length) can be treated differently for purposes establishing the design constraints in order to allow for relief from the application of strict electromigration limits in cases where, due to the Blech effect exhibited by short metal components, electromigration is not of concern. Specifically, for a short metal component, the maximum direct current as a function of a given temperature (e.g., a customer-specified maximum operating temperature) for a given expected lifetime of the integrated circuit (e.g., for a customer-specified expected lifetime) can determined. Then, another maximum direct current can be determined based on the Blech length. The higher of these two can be automatically selected and used as the design constraint for the short metal component in the design flow. However, for a long metal component, only the maximum direct current as a function of the given temperature for the given expected lifetime can be determined and used as the design constraint, since the Blech effect does not apply. Thus, the embodiments allow for automatic selection of the most advantageous electromigration design constraints based on design specifications, including customer-specified parameters and, as result, synthesis and other design flow processes are optimized to avoid and/or minimize electromigration violations. Thus, the number of repairs required to fix such violations will also be reduced. It should be noted that the above-described embodiments are further advantageous during design as they can facilitate a "correct-by-construction" design approach and/or can facilitate design rule checks (i.e., checks to see if the physical layout of the chip satisfies the design rules). Also disclosed above are associated system and program storage device embodiments for designing an integrated circuit.

What is claimed is:

1. A computer-implemented method of designing an integrated circuit, said method comprising:
    determining, by a computer system and for a metal component of said integrated circuit, a first maximum direct current as a function of a given temperature for a given expected lifetime of said integrated circuit, said metal component having a length that is shorter than a Blech length;
    determining, by said computer system and for said metal component, a second maximum direct current based on said Blech length;
    automatically selecting, by said computer system, a higher one of said first maximum direct current and said second maximum direct current as a design constraint; and,
    synthesizing, by said computer system, a description of said integrated circuit into a netlist using said design constraint,
    said integrated circuit comprising an application-specific integrated circuit (ASIC), said metal component comprising a local interconnect providing a series connection from a first cell to a second cell in said application-specific integrated circuit (ASIC) and said synthesizing of said description into a netlist using said design constraint comprising automatically selecting said first cell from a cell library such that an output pin of said first cell has a maximum direct current load that is no greater than said higher one of said first maximum direct current and said second maximum direct current at said given temperature.

2. The method of claim 1, said given temperature and said given expected lifetime comprising customer-specified design parameters.

3. The method of claim 1, further comprising, after said synthesizing, performing at least one of placement and routing using said design constraint.

4. The method of claim 1, said second maximum direct current remaining essentially constant over a range of expected lifetimes and temperatures for said integrated circuit.

5. The method of claim 1, further comprising:
    determining, by said computer system and for an additional metal component of said integrated circuit, an additional maximum direct current as a function of said given temperature for said given expected lifetime, said additional metal component having a length that is greater than said Blech length; and,
    automatically selecting, by said computer system, said additional maximum direct current at said given temperature as an additional design constraint.

6. A system for designing an integrated circuit, said system comprising:
    a memory storing a description of an integrated circuit; and
    at least one processor in communication with said memory, said at least one processor comprising a design constraint calculator, said design constraint calculator performing the following:
        determining, for a metal component of said integrated circuit, a first maximum direct current as a function of a given temperature for a given expected lifetime of said integrated circuit, said metal component having a length that is shorter than a Blech length;
        determining, for said metal component, a second maximum direct current based on said Blech length; and,
        automatically selecting a higher one of said first maximum direct current and said second maximum direct current as a design constraint,
    said at least one processor further comprising a synthesis tool synthesizing said description into a netlist using said design constraint, and
    said integrated circuit comprising an application-specific integrated circuit (ASIC), said metal component comprising a local interconnect providing a series connection from a first cell to a second cell in said application-specific integrated circuit (ASIC) and said synthesizing tool synthesizing said description into said netlist using said design constraint comprising automatically selecting said first cell from a cell library such that an output pin of said first cell has a maximum direct current load that is no greater than said design constraint.

7. The system of claim 6, said given temperature and said given expected lifetime comprising customer-specified design parameters.

8. The system of claim 6, said at least one processor further comprising at least one of a placement tool and routing tool using said design constraint.

9. The system of claim 6, said second maximum direct current remaining essentially constant over a range of expected lifetimes and temperatures for said integrated circuit.

10. The system of claim 6,
    said design constraint calculator further performing the following:
        determining, for an additional metal component of said integrated circuit, an additional maximum direct current as a function of said given temperature for said given expected lifetime, said additional metal component having a length that is greater than said Blech length; and
        automating selecting said additional maximum direct current at said given temperature as an additional design constraint.

11. A non-transitory program storage device readable by a computer and tangibly embodying a program of instructions executable by said computer to perform a method of designing an integrated circuit, said method comprising:
    determining, for a metal component of said integrated circuit, a first maximum direct current as a function of a given temperature for a given expected lifetime of said integrated circuit, said metal component having a length that is shorter than a Blech length;
    determining, for said metal component, a second maximum direct current based on said Blech length;
    automatically selecting a higher one of said first maximum direct current and said second maximum direct current as a design constraint; and
    synthesizing a description of said integrated circuit into a netlist using said design constraint, said integrated circuit comprising an application-specific integrated circuit (ASIC), said metal component comprising a local interconnect providing a series connection from a first cell to a second cell in said application-specific integrated circuit (ASIC) and said synthesizing said description into said netlist using said design constraint comprising automatically selecting said first cell from a cell library such that an output pin of said first cell has a maximum direct current load that is no greater than said design constraint.

12. The program storage device of claim 11, said given temperature and said given expected lifetime comprising customer-specified design parameters.

13. The program storage device of claim 11, said method further comprising, after said synthesizing, performing at least one of placement and routing using said design constraint.

14. The program storage device of claim 11, said second maximum direct current remaining essentially constant over a range of expected lifetimes and temperatures for said integrated circuit.

* * * * *